(12) United States Patent
Wang et al.

(10) Patent No.: US 8,731,762 B1
(45) Date of Patent: May 20, 2014

(54) METHOD AND SYSTEM OF CONTROLLING A POWERTRAIN SYSTEM TO REDUCE TURBO LAG IN A HYBRID VEHICLE

(71) Applicant: GM Global Technology Operations LLC, Detroit, MI (US)

(72) Inventors: Wei D. Wang, Troy, MI (US); Lan Wang, Troy, MI (US); Jinming Liu, Saginaw, MI (US); Beth A. Bezaire, Novi, MI (US); Bryan N. Roos, Livonia, MI (US); William R. Cawthorne, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/869,317

(22) Filed: Apr. 24, 2013

(51) Int. Cl.
*B60L 9/00* (2006.01)
(52) U.S. Cl.
USPC .......................................................... 701/22
(58) Field of Classification Search
None
See application file for complete search history.

(56) References Cited

U.S. PATENT DOCUMENTS

| 7,908,064 | B2 | 3/2011 | Cawthorne et al. | |
|---|---|---|---|---|
| 8,473,133 | B2* | 6/2013 | Wang et al. | 701/22 |
| 2009/0112417 | A1 | 4/2009 | Kaminsky et al. | |
| 2011/0066308 | A1* | 3/2011 | Yang et al. | 701/22 |
| 2012/0271492 | A1* | 10/2012 | Wang et al. | 701/22 |

* cited by examiner

Primary Examiner — Thomas Tarcza
Assistant Examiner — Adam Alharbi
(74) Attorney, Agent, or Firm — Quinn Law Group, PLLC

(57) ABSTRACT

A method of controlling a powertrain system includes determining a torque request; selecting feasible input torque and input speed operating points; calculating aggregate system power losses; determining turbo efficiency as a function of a difference between a feasible input torque rate of change and a desired input torque rate of change required to reach the desired output torque; summing the turbo efficiency to the aggregate system power losses to determine total system losses corresponding to feasible input torques and input speed capable of producing the desired output torque; determining a feasible input torque and input speed corresponding to a substantially minimum total system power loss; and selecting as a desired input speed and input torque that corresponds to the substantially minimum total system power loss.

19 Claims, 13 Drawing Sheets

METHOD AND SYSTEM OF CONTROLLING A POWERTRAIN SYSTEM TO REDUCE TURBO LAG IN A HYBRID VEHICLE

TECHNICAL FIELD

The present disclosure relates to systems and methods of controlling a powertrain system to reduce a turbo lag in a hybrid vehicle.

BACKGROUND

Known hybrid powertrain architectures may include multiple torque-generative devices, including internal combustion engines and non-combustion machines, e.g., electric machines, which transmit torque through a transmission device to an output member. One exemplary hybrid powertrain includes a two-mode, compound-split, electro-mechanical transmission that utilizes an input member for receiving tractive torque from a prime mover power source, preferably an internal combustion engine, and an output member. The output member can be operatively connected to a driveline of a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system monitors various inputs from the vehicle and the operator and provides operational control of the hybrid powertrain, including controlling transmission operating range state and gear shifting, controlling the torque-generative devices, and regulating the power interchange among the energy storage device and the machines to manage outputs of the transmission, including torque and rotational speed.

SUMMARY

The present disclosures relates to methods of controlling a powertrain system to reduce turbo lag. The method may be performed by a system controller. The system controller may include one or more processors and one or more computer readable mediums. In an embodiment, the method includes determining a torque request; selecting feasible input torque and input speed operating points; calculating aggregate system power losses corresponding to the selected feasible input torques and input speed capable of producing a desired output torque based on the torque request; determining turbo efficiency as a function of a difference between a feasible input torque rate of change and a desired input torque rate of change required to reach the desired output torque within a predetermined amount of time at different input speed; summing the turbo efficiency to the aggregate system power losses to determine total system losses corresponding to feasible input torques and input speed capable of producing the desired output torque; determining a feasible input torque and input speed corresponding to a substantially minimum total system power loss; and selecting as a desired input speed and input torque that corresponds to the substantially minimum total system power loss.

The step of determining the turbo efficiency may include determining whether a turbo lag is expected. The step of determining whether a turbo lag is expected may include comparing a current engine speed with a predetermined calibratable engine speed threshold. The step of determining the turbo efficiency may include assigning the turbo efficiency a value of zero if the turbo lag is not expected. The step of determining the turbo efficiency may include: determining the desired input torque rate of change to achieve the desired output torque if the turbo lag is expected; and calculates a difference between the desired input torque rate of change and the feasible input torque for all feasible input speeds.

The step of calculating aggregate system power losses includes calculating individual subsystem power losses, and summing the individual subsystem power losses. The individual subsystem power losses may include motor losses and transmission losses. The step of determining the feasible input torque may include performing an iterative derivative convergence. The step of determining the feasible input speed may include performing a section search in feasible input torques and corresponding total system losses. The method may further include determining an engine speed profile based on the desired input speed and a current engine speed. The step of determining the input speed profile may include filtering the engine speed profile. The step of filtering the engine speed profile may include using a filter with a time constant that is a function of an accelerator pedal position rate of change and a difference between a desired engine torque and a current engine torque.

The present disclosure also relates to hybrid powertrains systems. In an embodiment, the powertrain system includes an engine, a turbocharger disposed in fluid communication with the engine such that the turbocharger is configured to supply the engine with compressed air, an electrically variable transmission coupled to the engine and configured to transfer kinetic energy originating from the engine, and a system controller. The system controller is configured to: determining a torque request; select feasible input torque and input speed operating points; calculate aggregate system power losses corresponding to selected feasible input torques and input speed capable of producing a desired output torque based on the torque request; determine turbo efficiency as a function of a difference between a feasible input torque rate of change and a desired input torque rate of change required to reach the desired output torque within a predetermined amount of time; add the turbo efficiency to the aggregate system power losses to determine total system losses corresponding to feasible input torques capable of producing the desired output torque at different input speed; determine a feasible input speed and input torque corresponding to a substantially minimum total system power loss; and select as a desired input speed and input torque that corresponds to the substantially minimum total system power loss.

In an embodiment, the system controller is configured to determine if a turbo lag is expected. The system controller is configured to determine if the turbo lag is expected by comparing a current engine speed with a predetermined calibratable engine speed threshold. The system controller is configured to determine the desired input torque rate of change to achieve the desired output torque if the turbo lag is expected. The system controller is configured to calculate a difference between the desired input torque rate of change and the feasible input torque for all feasible input speeds. The system controller is configured to determine an engine speed profile based on the desired input speed and a current engine speed. The system controller is configured to perform a section search in feasible input torques and input speed and corresponding total system power loses to determine the feasible input speed and input torque.

The above features and advantages, and other features and advantages, of the present invention are readily apparent from the following detailed description of some of the best modes and other embodiments for carrying out the invention, as

DETAILED DESCRIPTION

Figure 1:
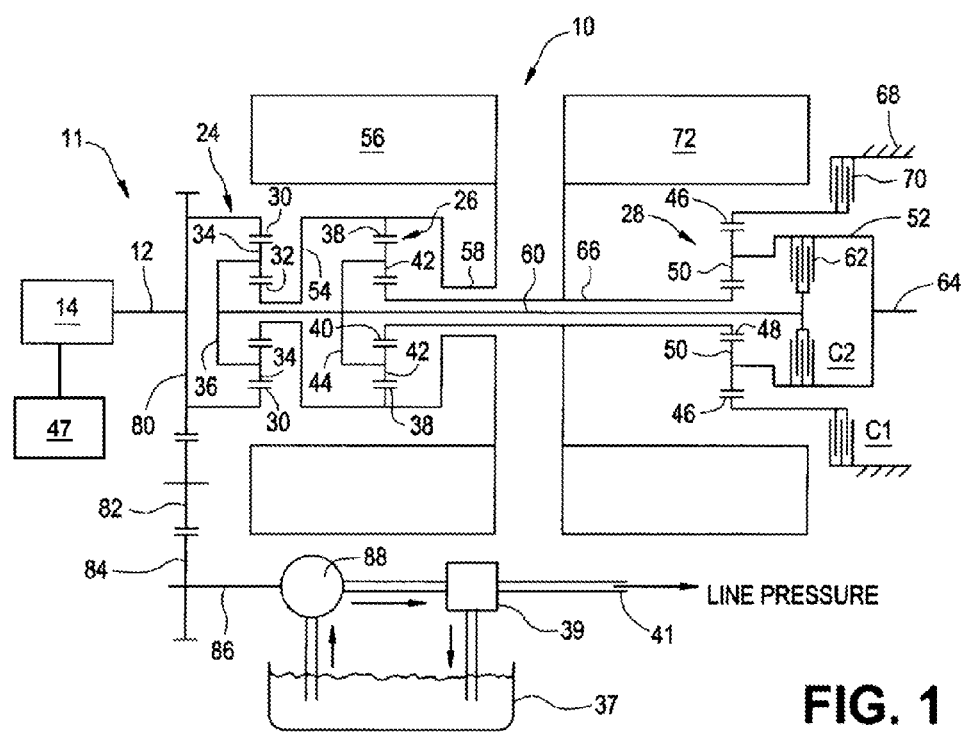
FIG. 1 is a mechanical hardware schematic representation a vehicle including a hybrid powertrain system.
Figure 2:
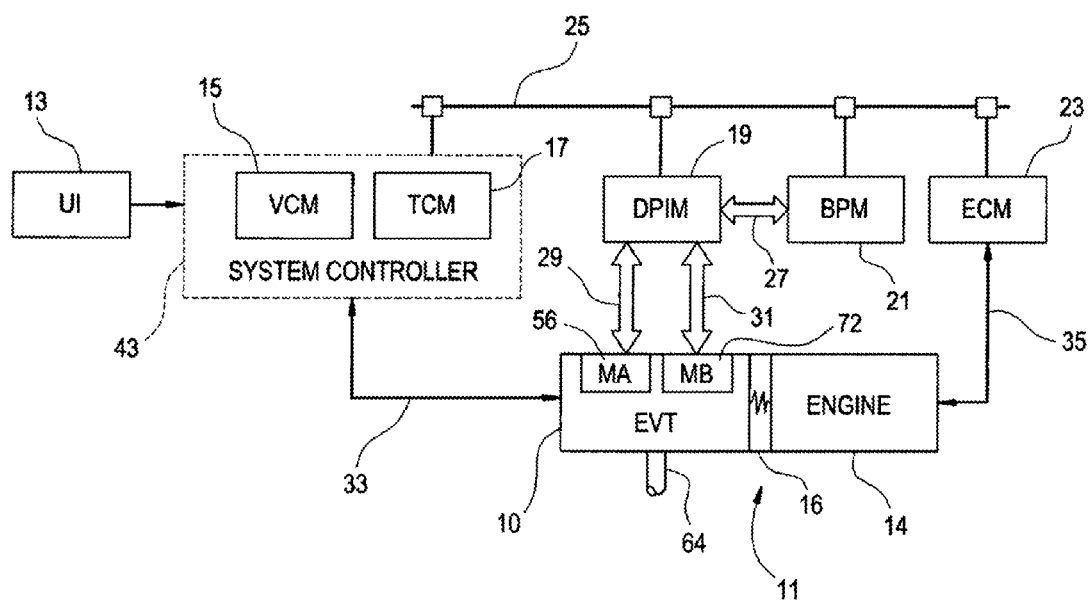
FIG. 2 is an electrical and mechanical schematic representation of a system architecture of the vehicle of FIG. 1.

Referring to the drawings, wherein like reference numbers refer to like components, FIG. 1 shows a vehicle including a hybrid powertrain system 11. The powertrain system 11 includes an engine 14 and a multi-mode, compound split, electrically variable transmission (EVT) 10 configured to transfer kinetic energy from the engine 14 to driven members such as wheels (not shown). The EVT 10 is particularly suited for implementing the controls of the present disclosure and includes an input member 12, which may be a shaft directly driven by the engine 14 or, as shown in FIG. 2, a transient torque damper 16 (FIG. 2) coupled between the output member of the engine 14 and the input member of the EVT 10. The transient torque damper 16 (FIG. 2) may include, or be employed in conjunction with, a torque transfer device (not shown) to permit selective engagement of the engine 14 with the EVT 10. This torque transfer device is not utilized to change, or control, the mode in which the EVT 10 operates.

The engine 14 may be a fossil fuel engine, such as a diesel engine, and may be configured to supply power output at a constant speed as measured in revolutions per minute (RPM). Accordingly, the engine 14 can operate at a constant speed or at a variety of constant speeds in accordance with a desired operating point as may be determined from operator inputs and driving conditions.

The vehicle includes a turbocharger 47 configured to supply pressurized air to the engine 14 via an intake manifold (not shown). The turbocharger 47 may include a turbine (not shown) powered by exhaust gases stemming from the engine 14 and a compressor (not shown) driven by the turbine. The compressor of the turbocharger 47 is configured to compress air and deliver the compressed air to the engine 14 via the intake manifold. Alternatively, a supercharger, driven by a camshaft, may compress air and deliver the compressed air to the engine 14 via the intake manifold. Although incorporating a turbocharger typically increases the engine torque while improving its fuel economy, vehicles using a turbocharger may experience a turbo lag. A turbo lag is the period of time it takes the turbocharger to provide a boost to the engine to begin applying the desired torque. During this turbo lag, the operation of the vehicle feels sluggish. It is therefore desirable to reduce the turbo lag in order to reduce the sluggish feeling of the vehicle. In the powertrain system 11, the engine speed may be selected independently of the output speed or output torque. It is therefore possibly to control the engine speed to reduce the turbo lag.

The EVT 10 includes three planetary gear subsets 24, 26 and 28. The first planetary gear subset 24 has a first inner gear member 32 and a first outer gear member 30 circumscribing the first inner gear member 32. As such, the first inner gear member 32 may be configured as a sun gear, and the first outer gear member 30 may be configured as a ring gear. The planetary gear subset 24 further includes a first carrier 36 and a plurality of first planet gear members 34 rotatably mounted on the first carrier 36 such that each first planet gear member 34 meshingly engages both the first outer gear member 30 and the first inner gear member 32.

The second planetary gear subset 26 includes a second inner gear member 40 and a second outer gear member 38 circumscribing the second inner gear member 40. Accordingly, the second inner gear member 40 may be configured as a sun gear, and the second outer gear member 38 may be configured as a ring gear. The second planetary gear subset 26 further includes a second carrier 44 and a plurality of second planet gear members 42 rotatably mounted on the second carrier 44 such that each second planet gear member 42 meshingly engages both the second outer gear member 38 and the second inner gear member 40.

The third planetary gear subset 28 includes a third inner gear member 48 and a third outer gear member 46 circumscribing the third inner gear member 48. Thus, the third outer gear member 46 may be configured as a ring gear, and the third inner gear member 48 may be configured as a sun gear. The third planetary gear subset 28 further includes a third carrier 52 and a plurality of third planet gear members 50 rotatably mounted on the third carrier 52 such that each third planet gear member 50 meshingly engages both the third outer gear member 46 and the third inner gear member 48.

While each planetary gear subset 24, 26 and 28 may be simple planetary gear subsets, the first and second planetary gear subsets 24 and 26 are operatively coupled to each other via any suitable coupler such as a hub plate gear 54. In particular, the hub plate gear 54 may operatively couple the first inner gear member 32 of the first planetary gear subset 24 to the second outer gear member 38 of the second planetary gear subset 26. The first inner gear member 32 and the second outer gear member 38 may be connected to a first motor/generator 56 through a sleeve shaft 58. The first motor/generator 56 may also be referred to herein variously as motor A or MA.

A shaft 60 may couple the first carrier 36 of the first planetary gear subset 24 to the second carrier 44 of the second planetary gear subset 26. Furthermore, the shaft 60 is selectively connected to the third carrier 52 of the third planetary gear subset 28 through a second torque transfer device 62. The second torque transfer device 62 may be employed to assist in the selection of the operational modes of the EVT 10. In the present disclosure, the second torque transfer device 62 may also be referred to as second clutch, clutch two or C2.

The third carrier 52 of the third planetary gear subset 28 may be connected directly to a transmission output member 64. When the EVT 10 is used in a land vehicle, the transmission output member 64 may be connected to the vehicular axles (not shown), which may in turn be connected to in the driven members (not shown). The driven members may be front or rear wheels of the vehicle or a drive gear of a track vehicle.

The second inner gear member 40 of the second planetary gear subset 26 may be connected to the third inner gear member 48 of the third planetary gear subset 28 via a sleeve shaft 66 that circumscribes shaft 60. The third outer gear member 46 of the third planetary gear subset 28 may be selectively connected to ground, represented by a transmission housing 68, through a first torque transfer device 70. The first torque transfer device 70 may be employed to assist in the selection of the operational modes of the EVT 10. In the present disclosure, the first torque transfer device 70 may also be referred to as first clutch, clutch one, or C1.

The sleeve shaft 66 may be continuously connected to a second motor/generator 72. The second motor/generator 72 may also be referred to as motor B or MB. All the planetary gear subsets 24, 26 and 28 as well as motor A and motor B (56, 72) are coaxially oriented about the axially disposed shaft 60. It should be noted that both motors A and B are of an annular configuration which allows them to circumscribe the three planetary gear subsets 24, 26 and 28 such that the planetary gear subsets 24, 26 and 28 are disposed radially inwardly of the motors A and B. This configuration helps minimize the overall outer perimeter, such as the circumference, of the EVT 10.

A drive gear 80 is coupled to the input member 12 and may fixedly connect the input member 12 to the first outer gear member 30 of the first planetary gear subset 24. Accordingly, the drive gear 80 is configured to receive power from the engine 14, the motor/generators 56, 72, or a combination thereof. The drive gear 80 meshingly engages an idler gear 82 that in turn meshingly engages a transfer gear 84 that is secured to one end of a shaft 86. The other end of the shaft 86 may be secured to a transmission fluid pump 88, which receives transmission fluid from a sump 37. The sump 37 delivers high pressure fluid to a regulator 39 that returns a portion of the fluid to the sump 37 and provides regulated line pressure in line 41.

In the described exemplary mechanical arrangement, the transmission output member 64 receives power through two distinct gear trains within the EVT 10. A first mode, or gear train, is selected when the first clutch 70 is actuated in order to "ground" the third outer gear member 46 of the third planetary gear subset 28. A second mode, or gear train, is selected when the first clutch 70 is released and the second clutch 62 is simultaneously actuated to connect the shaft 60 to the third carrier 52 of the third planetary gear subset 28. As used herein, when a mode related to a gear train is referenced, an upper case designation MODE 1 or MODE 2, or M1 or M2 is used.

The EVT 10 is capable of providing a range of output speeds from relatively slow to relatively fast within each mode of operation. This combination of two modes with a slow to fast output speed range in each mode allows the EVT 10 to propel the vehicle from a stationary condition to highway speeds. In addition, a fixed-ratio state wherein both clutches C1, 70 and C2, 62 are simultaneously applied is available for efficient mechanical coupling of the input member 12 to the transmission output member 64 through a fixed gear ratio. Furthermore, a neutral state wherein both clutches C1 and C2 are simultaneously released is available for mechanically decoupling the transmission output member 64 from the EVT 10. Finally, the EVT 10 is capable of providing synchronized shifts between the modes wherein slip speed across both clutches C1 and C2 is substantially zero.

With reference to FIG. 2, the engine 14 may be electronically controlled by an engine control module (ECM) 23, which may be a conventional microprocessor based diesel engine controller including such common elements as a microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. The ECM 23 functions to acquire data from a variety of sensors and control a variety of actuators, respectively, of the engine 14 over a plurality of discrete lines. For simplicity, ECM 23 is shown generally in bi-directional interface with the engine 14 via aggregate line 35 and may be configured to receive signals indicative of various parameters such as oil sump and engine coolant temperatures, engine speed Ne, turbo pressure, and ambient air temperature and pressure. In response to these signals, the ECM 23 may be configured to control one or more actuators such as fuel injectors, fan controllers, and engine preheaters including glow plugs and grid-type intake air heaters. Further, the ECM 23 is also configured to control the engine 14 in response to a torque command Te_cmd.

The EVT 10 can selectively receive power from the engine 14 and from an electric storage device such as one or more batteries in battery pack module (BPM) 21. The powertrain system 11 may also include such energy storage devices that are an integral part of the power flows thereof. Other electric storage devices that have the ability to store electric power and dispense electric power may be used in place of the batteries without altering the concepts of the present invention. The BPM 21 is high voltage DC coupled to a dual power inverter module (DPIM) 19 via DC lines 27. Electric current can be transferred to or from the BPM 21 depending on whether the BPM 21 is being charged or discharged.

The DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the power inverter can receive electric current from the DC lines 27 and provides AC current to the respective motor 56 or 72 over high voltage phase lines 29 and 31. In regeneration control, the respective inverter receives AC current from the motor 56 or 72 over high voltage phase lines 29 and 31 and then provides electric current to the DC lines 27. The net DC current provided to or from the power inverters determines the charge or discharge operating mode of the BPM 21. The first and second motors/generators 56, 72 may be three-phase AC machines, and the power inverters may include complementary three-phase power electronics. Individual motor speed signals Na and Nb for the motors 56, 72, respectively, are also derived by the DPIM 19 from the motor phase information or conventional rotation sensors.

The powertrain system 11 further includes a system controller 43, which is a microprocessor based controller having such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. The system controller 43 may include a pair of microprocessor based controllers designated as vehicle control module (VCM) 15 and transmission control module (TCM) 17. VCM 15 and TCM 17 may perform a variety of control and diagnostic functions related to the EVT 10 and vehicle chassis including, for example, engine torque commands, input speed control, and output torque control in coordination with regenerative braking, anti-lock braking and traction control. For example, the system controller 43 may function to acquire data from a variety of sensors and control a variety of actuators over a plurality of discrete lines. For simplicity, the system controller 43 is shown generally in bi-directional interface with EVT 10 via an aggregate line 33. In the depicted embodiment, system controller 43 is configured to receive frequency signals from rotation sensors for processing into input member speed Ni (i.e., speed of input member 12) and output member speed No (i.e., speed of output member 64) for use in the control of EVT 10

The system controller 43 is also capable of receiving and processing pressure signals from pressure switches (not shown) for monitoring clutch C1, 70 and C2, 62 application chamber pressures. Alternatively, pressure transducers for wide range pressure monitoring may be employed. Pulse-width modulation (PWM) signals, binary control signals, or both may be provided by system controller 43 to the EVT 10 for controlling fill and drain of clutches C1, 70 and C2, 62 for application and release thereof. Additionally, the system controller 43 may be configured to receive transmission fluid sump 37 temperature data, such as from conventional thermocouple input (not shown) to derive sump temperature Ts and provide a PWM signal which may be derived from input speed Ni and sump temperature Ts for control of line pressure via the regulator 39. Solenoid controlled spool valves (not shown) may control the fill and drain of clutches C1, 70 and C2, 62 in response to responsive to PWM and binary control signals mentioned above. Trim valves may be employed using variable bleed solenoids to provide precise placement of the spool within the valve body and correspondingly precise control of clutch pressure. Similarly, the line pressure regulator 39 (FIG. 1) may be of a solenoid controlled variety for establishing regulated line pressure in accordance with the described PWM signal. Clutch slip speeds across clutches C1, 70 and C2, 62 are derived from output speed No, MA speed Na and MB speed Nb. Specifically, C1 slip is a function of No and Nb, whereas C2 slip is a function of No, Na and Nb. The powertrain system 11 further includes a user interface (UI) 13 capable of receiving suitable inputs from a user and transferring such inputs to the system controller 43. The inputs supplied by the UI 13 may include vehicle throttle position, push button shift selector (PBSS) for available drive range selection, brake effort and fast idle requests, among others.

The system controller 43 is capable of determining a torque command Te_cmd and provides the torque command Te_cmd to the ECM 23. The torque command Te_cmd is representative of the EVT torque contribution desired from the engine 14 as determined by the system controller 43. System controller 43 can also determine a speed command Ne_des representative of the desired EVT input speed. The desired EVT input speed may be equal to the desired engine speed operating point if the engine 14 and the EVT 10 are in a direct coupled arrangement. If the engine 14 and the EVT 10 are in a direct coupled arrangement, the engine torque Te and the EVT input torque Ti are equivalent and may therefore be referred to in the alternative herein. Similarly, the engine speed Ne and the EVT input speed Ni may be equivalent and may therefore be referred to in the alternative herein.

The various modules described (i.e. system controller 43, DPIM 19, BPM 21, ECM 23) communicate via controller area network (CAN) bus 25. The CAN bus 25 allows for communication of control parameters and commands between the various modules. The CAN bus 25 and appropriate protocols provide for robust messaging and multi-controller interfacing between the system controller, ECM 23, DPIM 19, BPIM 21, and other controllers such as antilock brake and traction controllers.

Figure 3:
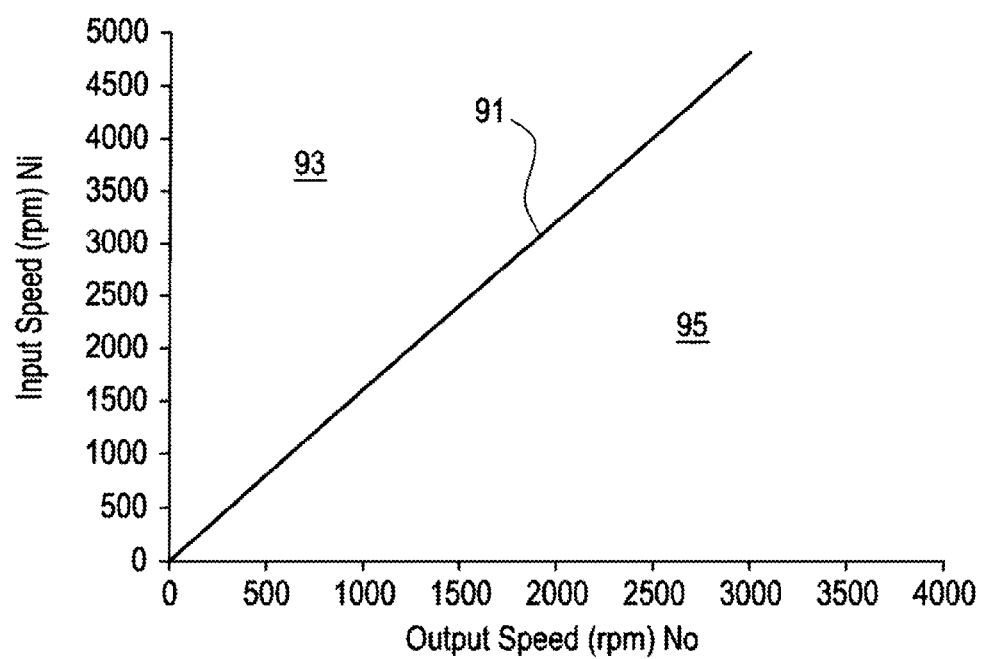
FIG. 3 is a graphical representation of various regions of operation with respect to input and output speeds of the exemplary electrically variable transmission of the powertrain system schematically shown in FIG. 1.

FIG. 3 illustrates a plot of output speed No along the horizontal axis versus input speed Ni across the vertical axis for the EVT 10. Line 91 represents a synchronous operation, which is the input speed and output speed relationships where both clutch C1, 70 and C2, 62 are operating simultaneously with substantially zero slip speed thereacross. As such, line 91 represents the input and output speed relationships substantially where synchronous shifting from between modes can occur or where direct mechanical coupling from input to output can be conducted by simultaneous application of both clutches C1, 79 and C2, 62 also known as fixed-ratio. One particular gearset relationship capable of producing the synchronous operation depicted by line 91 in FIG. 3 is as follows: outer gear member 30 having ninety-one teeth, inner gear member 32 having forty-nine teeth, planet gear members 34 having 21 teeth; outer gear member 38 having ninety-one teeth, inner gear member 40 having forty-nine teeth, planet gear members 42 having twenty-one teeth; outer gear member 46 having eighty-nine teeth, inner gear member 48 having thirty-one teeth, planet gear member 50 having twenty-nine teeth. Line 91 may be variously referred to herein as synchronous line, shift ratio line or fixed-ratio line.

The preferred region of operation 93 for the first mode wherein C1, 70 is applied and C2, 62 is released is the area to the left of the shift ratio line 91. The preferred region of operation 95 for the second mode wherein C1, 70 is released and C2, 62 is applied is the area to the right of the shift ratio line 91. When used herein with respect to clutches C1, 70 and C2, 62, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. The mode change is completed when fixed-ratio is exited by the continued application of the clutch associated with the mode being entered and the release of the clutch associated with the mode being exited.

While the region of operation 93 is generally preferred for the operation of the EVT 10 in MODE 1, it is not meant to imply that MODE 2 operation of the EVT 10 cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while the region of operation 95 is generally preferred for the operation of the EVT 10 in MODE 2, it is not meant to imply that MODE 1 operation of the EVT 10 cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 95. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

As a starting point for the present control, various powertrain parameters are measured or otherwise predetermined. Output speed No and input speed Ni are preferably derived from sensed and filtered signals. Motor speeds Na and Nb are known through sensing, calculated with known coupling constraints of the EVT 10, or derived through the motor control phase information. Input acceleration Ni_dot is preferably a desired rate of change of transmission input speed. Output speed acceleration No_dot is preferably determined in accordance with sensed and filtered output speed No.

Figure 7:
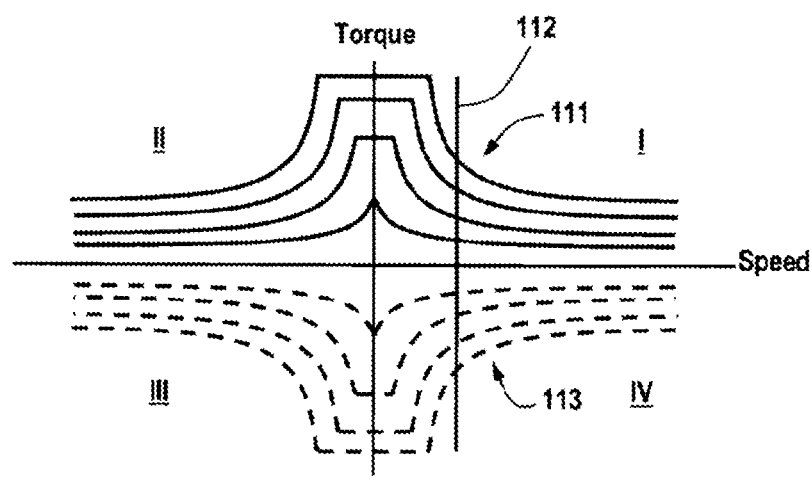
FIG. 7 is a graphical depiction of empirically determined motor torque vs. speed characteristic data utilized in the determination of feasible operating space.

Minimum and maximum motor torques (Ta_min, Ta_max, Tb_min and Tb_max) within the present condition capabilities of the motors are preferably obtained from data sets stored in table form within data structures in system controller 43. Such data sets are provided for reference by the routine in pre-stored table format having been empirically derived from conventional dynamometer testing of the combined motor and power electronics (e.g. power inverter) at various temperature and voltage conditions. An exemplary representation of such characteristic motor torque vs. speed data is illustrated in FIG. 7 wherein minimum and maximum data for a given speed are represented by the line of constant speed 112 intersecting exemplary lines of constant temperature/voltage 111, 113. The tabulated data is referenced by the motor speed Na, Nb, voltage and temperature. Motor speeds can be derived from the input speed Ni and output speed No in accordance with the following known coupling constraint equation:

$$\begin{bmatrix} Na \\ Nb \end{bmatrix} = \begin{bmatrix} K_{11} & K_{12} \\ K_{21} & K_{22} \end{bmatrix} \begin{bmatrix} Ni \\ No \end{bmatrix}$$

where Na is motor A speed,
Nb is motor B speed,
Ni is EVT input speed,
No is EVT output speed, and
Kn is a 2×2 matrix of parametric values determined by the hardware gear and shaft interconnections.

While the motors are used in both motoring and generating modes—suggesting four-quadrants (I, II, III, IV) of torque/speed data—two quadrant data collection is generally sufficient wherein the data collected in adjacent quadrants is merely reflected in the other quadrants not directly measured. In the present example, quadrants I and II are shown with determined data 111 whereas quadrants III and IV are shown populated with reflected data 113 therefrom.

Minimum and maximum battery power, Pbatt_min and Pbatt_max, within the present condition capabilities of the batteries are preferably obtained from data sets stored in table form within data structures in system controller 43. Such data sets are provided for reference by the routine in pre-stored table format having been correlated to various conditions, e.g. state of charge, temperature, voltage and usage (amp-hour/hour).

Figure 4:
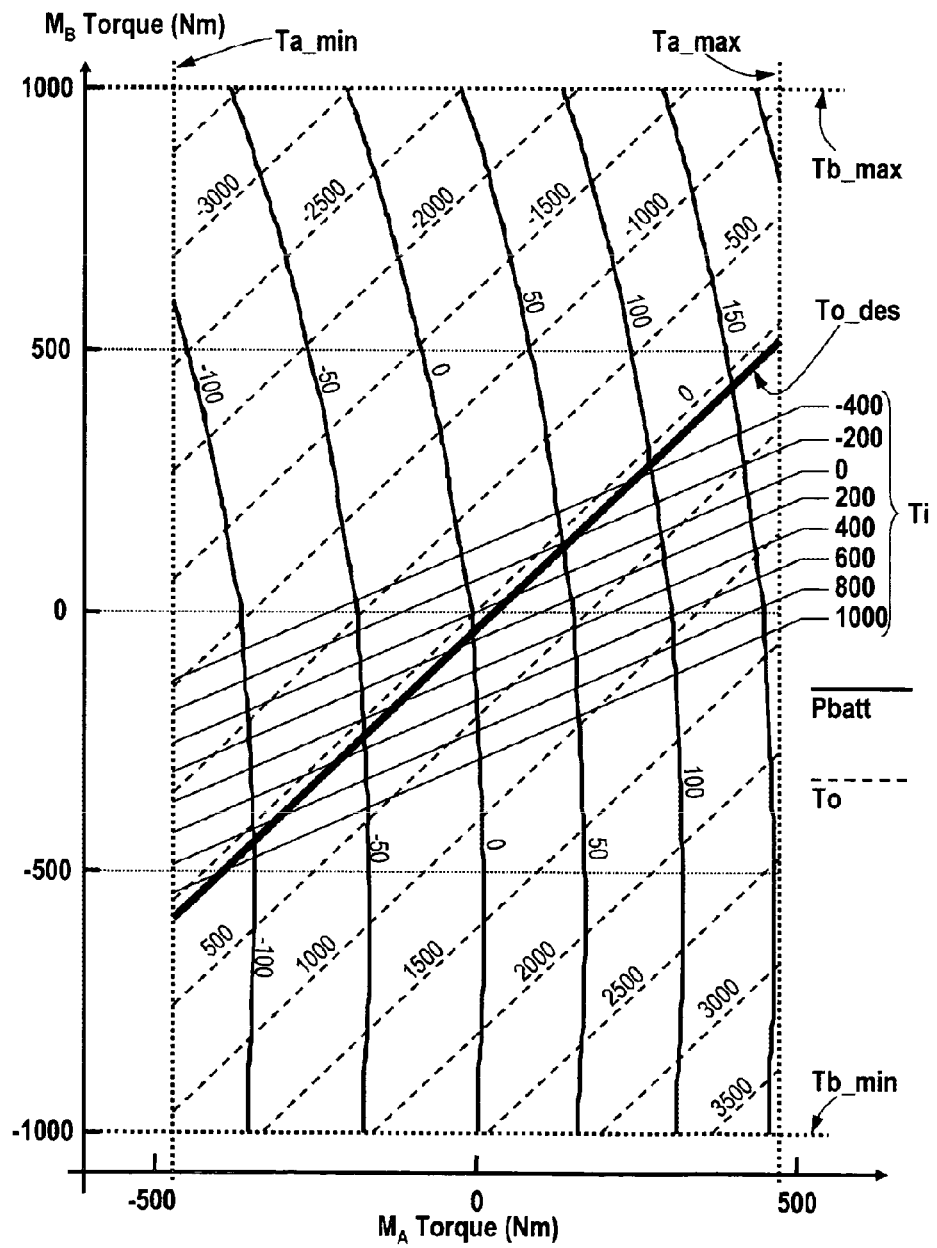
FIG. 4 is a torque space plot in motor torques (Ta and Tb) including exemplary lines of constant battery power (Pbatt), exemplary lines of constant output torque (To) and exemplary lines of constant engine torque (i.e. input torque Ti)

With reference now to FIG. 4, motor A torque is plotted across the horizontal axis and motor B torque is plotted across the vertical axis. Boundaries are drawn as dotted lines corresponding to minimum and maximum motor A torques (Ta_min and Ta_max), the minimum and maximum being_with respect to motor capabilities at certain exemplary present operating conditions in Ni, No, Ni_dot and No_dot, the precise values of which are not required for the present exposition of the teachings to be gained from FIG. 4 and the present discussion. Similar boundaries are drawn as dotted lines corresponding to such minimum and maximum motor B torques (Tb_min and Tb_max). The enclosed space represents a feasible solution space at present conditions for the motor units MA and MB. Once again, the precise values used herein are not critical to the understanding to be gained from the present description and figure, but are provided for appropriate context and to reduce the teaching's abstraction.

Within this motor torque solution space are plotted several other parameter lines of constant values which similarly are provided with exemplary values which are not critical to the understanding to be gained from the present description and figure but which are provided for appropriate context and reduction in abstraction of the present teaching. A plurality of lines of constant battery power Pbatt is plotted which represent constant battery power solutions within the feasible solution space in Ta and Tb. Also plotted within this motor torque solution space are lines of constant output torque To, which represent constant output torque solutions within the feasible solution space in Ta and Tb. Finally, lines of constant input torque are plotted within the same feasible solution space in Ta and Tb and represent constant input torque solutions therein. In the graphic representation of FIG. 4, while the space with respect to Ta and Tb is feasible in accordance with the capabilities of the respective motor units, the lines of constant battery power Pbatt, lines of constant output torque To and lines of constant input torque Ti are not necessarily representative of feasible solutions with respect to their respective subsystem capabilities at present conditions. But for the sake of clarity in FIG. 4, the lines of constant input torque Ti are limited to feasible solutions of input torques, e.g. −400 Nm to 1000 Nm in the present example.

With continued reference to FIG. 4, a desired output torque To_des is plotted and represented in the figure as a thick solid line. To_des represents the system constrained output torque target for the control. It may correspond to the torque requested by the vehicle operator in the event that the request is within the system's capabilities. But it may correspond to a constrained output torque in accordance with system limits. To_des may also be constrained in accordance with other factors apart from system capabilities such as vehicle driveability and stability considerations. Constrained output torques may be determined in accordance with minimum and maximum input torque capabilities at present operating conditions (Ti_min, Ti_max), minimum and maximum motor torques at present operating conditions (Ta_min, Ta_max, Tb_min, Tb_max) and minimum and maximum battery power capabilities at present operating conditions (Pbatt_min, Pbatt_max).

It is along this To_des line that the feasible solution space within Ta and Tb is presently relevant. Similarly, it is along this To_des line that that the feasible input torques, −400 Nm>Ti>1000 Nm are presently relevant. It is also along this To_des line that the feasible battery powers Pbatt_min>Pbatt>Pbatt_max are presently relevant. The overall feasible solution space for To_des, therefore, is variously bounded by present capabilities as presented as minimum and maximum motor unit torques, input torques, and battery powers.

Figure 9:
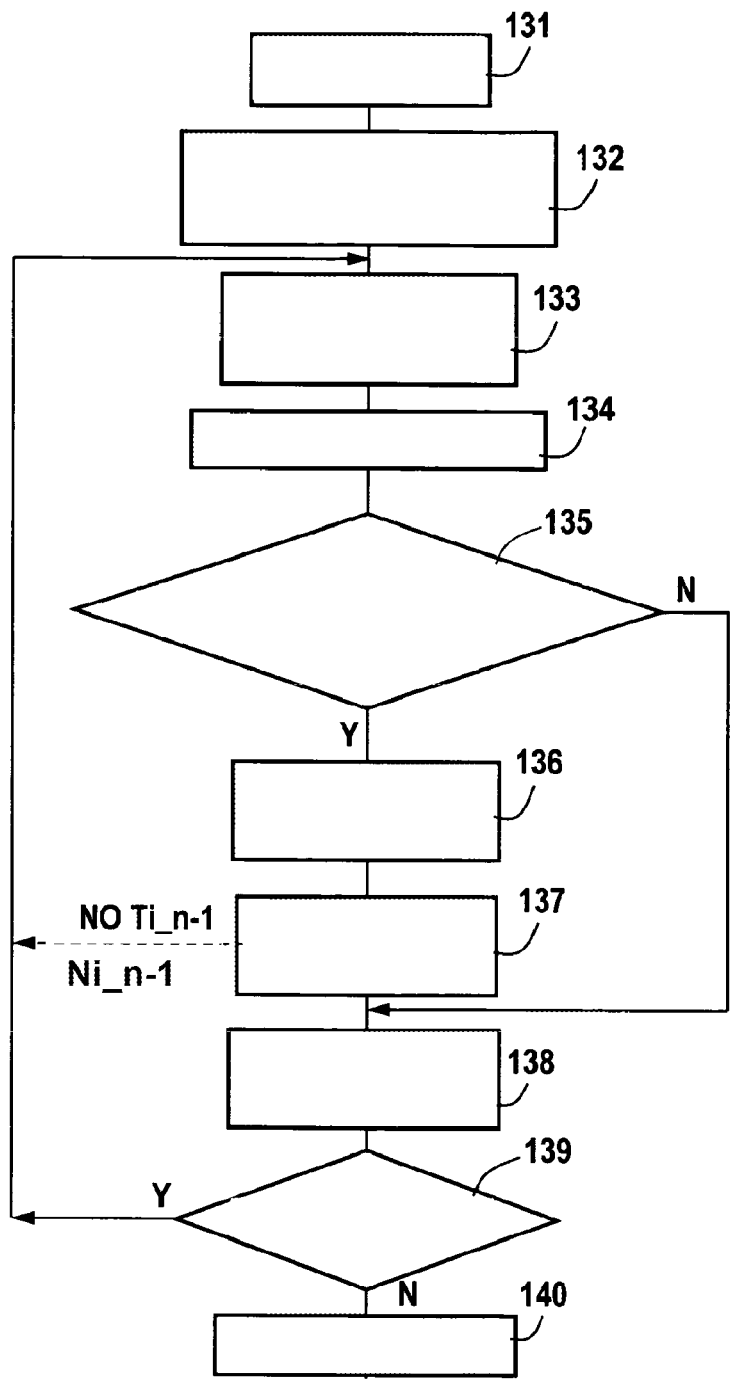
FIG. 9 illustrates a flowchart of exemplary steps in a set of instructions executed by a computer based controller particularly suited to determine the optimum powertrain operating parameters.

Referring to FIG. 9, within this feasible solution space it is desirable to determine an optimum operating point for input torque and input speed. A preferred method for determining input torque and input speed within a feasible solution space as described is set forth below in reference to the flow chart of FIG. 9. The flow chart illustrates representative steps for carrying out the method of the present invention comprising instructions implemented as part of the executable computer code and data structures of system controller 43. The instructions represented thereby are, of course, executed as a part of a much larger group of instruction sets and routines carrying out the various control and diagnostic function of the powertrain previously described.

Beginning with step 131, the operator request for output torque is determined. In other words, the vehicle operator torque request is determined. Preferably, a torque request is resolved from a plurality of operator inputs including: accelerator pedal position, brake pedal position and shift selector position, vehicle dynamic conditions such as acceleration rate or deceleration rate, and EVT operational conditions such as temperatures, voltages, currents and speeds.

At step 132, the desired output torque To_des is determined. The requested torque from step 131 is evaluated and subjected to a variety of limit tests to ensure that the resultant desired output torque is within various system constraints. The constraints include input torque maximums and minimums as determined in accordance with present operating conditions for the engine including predominantly actual engine speed Ne (e.g., input speed Ni). The constraints further include motor minimum and maximum torques and minimum and maximum battery powers.

A section search is preferably performed with the objective of quickly converging upon a preferred input torque operating point and preferred input speed as described below. Within the maximum and minimum input torque limits Ti_min and Ti_max already established, an evaluation input torque Ti_n is selected at step 133. Although the feasible input torques are constrained by input torque limits Ti_min and Ti_max, the feasible input torques should be capable of producing the desired output torque To_des based on the torque request by the vehicle operator. Similarly, an input speed Ni_n can be selected with the Ni_min and Ni_max. Evaluation input torque and input speed are preferably established in accordance with the well-known golden section ratio, wherein the entire range of remaining feasible input torques (Ti_min to Ti_max, and Ni_min and Ni_max, in the initial iteration) are effectively divided into two regions having the ratios $\Phi$ and $1-\Phi$ with respect to the whole region wherein:

$\Phi = (\sqrt{5}-1/)2$ which is approximately equal to 0.61803.

In subsequent iterations, the $\Phi$ ratio section is measured off with respect to a newly established boundary of the region to be evaluated as explained at a later point more fully in conjunction with the illustration of FIG. 6.

At step 134, battery power Pbatt is next determined at the selected evaluation input torque Ti_n. The following coupling constraint equation is known for the EVT 10 for calculating the motor A and motor B torques:

$$\begin{bmatrix} Ta \\ Tb \end{bmatrix} = \begin{bmatrix} K_{11} K_{12} K_{13} K_{14} \\ K_{21} K_{22} K_{23} K_{24} \end{bmatrix} \begin{bmatrix} Ti \\ To \\ Ni\_dot \\ No\_dot \end{bmatrix}$$

where Ta is motor A torque;
Tb is motor B torque;
Ti is EVT input torque;
To is EVT output torque;
Ni_dot is EVT input acceleration;
No_dot is EVT output acceleration; and
Kn is a 2×4 matrix of parametric values determined by the hardware gear and shaft interconnections and estimated hardware inertias applicable to the current drive range and represents what is commonly referred to as the plant model.

Additionally, motor speeds are derived from the following known coupling constraint equation:

$$\begin{bmatrix} Na \\ Nb \end{bmatrix} = \begin{bmatrix} K_{11} K_{12} \\ K_{21} K_{22} \end{bmatrix} \begin{bmatrix} Ni \\ No \end{bmatrix}$$

where Na is motor A speed;
Nb is motor B speed;
Ni is EVT input speed;
No is EVT output speed; and,
Kn is a 2×2 matrix of parametric values determined by the hardware gear and shaft interconnections.

Battery power at the evaluation input torque is determined in accordance with the following relationship:

Pbatt=Pmotor_A+Ploss_A+Pmotor_B+Ploss_B+ Ploss_acc where Pmotor_A and Pmotor_B are unit A and unit B motor power, respectively; Ploss_A and Ploss_B are unit A and unit B aggregate motor and power electronic losses (motor losses), respectively; and Ploss_acc represents an accessory power losses modeled as a DC load, e.g. VxI, representing battery draw to power accessories or any other load upon the batteries not directly related to the motor units A and B.

Figure 10:
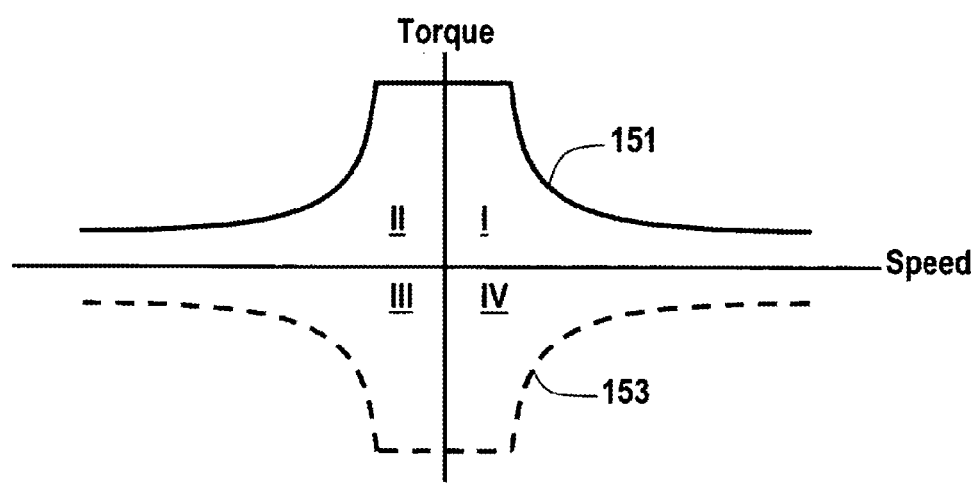
FIG. 10 is a graphical depiction of empirically determined motor torque vs. speed characteristics data utilized in determining motor losses.

With reference to FIG. 10, motor losses are provided for reference by the routine in pre-stored table format indexed by the motor torque and motor speed, having been empirically derived from conventional dynamometer testing of the combined motor and power electronics (e.g. power inverter). An exemplary representation of such characteristic motor torque vs. speed data is illustrated in FIG. 10. The tabulated data is referenced by the motor torque Ta, Tb and motor speed Na, Nb. The difference between the electrical power input Ia*V and Ib*V and the motor shaft mechanical power output Ta*Na and Tb*Nb equates to the motor power loss Ploss_A, Ploss_B as follows:

$$Ploss\_A=Ia*V-Pmotor-A; \text{ and,}$$

$$Ploss\_B=Ib*V-Pmotor-B$$

where Ia and Ib are the currents delivered to motor A and motor B power inverters, respectively; and V is the voltage at which the currents are provided.

While the motors are used in both motoring and generating modes—suggesting four-quadrants (I, II, III, IV) of torque/speed data—two quadrant data collection is generally sufficient wherein the data collected in adjacent quadrants is merely reflected in the other quadrants not directly measured. In the present example, quadrants I and II are shown with determined data 151 whereas quadrants III and IV are shown populated with reflected data 153 therefrom.

Referring back to FIG. 9, at this point, in step 135, the system controller 43 performs an evaluation of the battery power Pbatt just determined by comparing the battery power to the battery power constraints or limits Pbatt_min and Pbatt_max at the present conditions. If battery power for the evaluated input torque is not within the limits, then the routine skips to step 138 whereat the present evaluation input torque/input speed Ti_n/Ni_n establishes a new input torque/speed boundary for the range of remaining feasible input torque/speed to be evaluated. An acceptable battery power otherwise results in control passing to cost estimation step 136 whereat various subsystem power losses and other subjective costs are determined for the evaluation input torque/speed.

In step 136, the system controller 43 determines an overall system power loss including a summation of individual subsystem power losses as follows:

$$Ploss\_total=Ploss\_evt+Ploss\_eng+Ploss\_A+Ploss\_B+Ploss\_batt$$

where Ploss_evt represents EVT or transmission losses such as hydraulic pumping loss, spin loss, clutch drag, etc.;

Ploss_eng represents engine losses associated with operating away from the most efficient Brake Specific Fuel Consumption (BSFC) point;

Ploss_A represents motor A losses;

Ploss_B represents motor B losses; and

Ploss_batt represents internal power losses for the batteries.

The EVT losses or transmission losses Ploss_evt are provided for reference by the routine in pre-stored table format indexed by Ni and No, having been empirically derived from conventional dynamometer testing of the EVT 10 throughout its various modes of operation and within the effective gear ratio ranges associated therewith.

The engine power losses Ploss_eng also are determined in accordance with pre-stored tabulated data. The engine power losses are provided for reference by the routine in pre-stored table format indexed by Ti and Ni. The preferred manner of generating such tables is through application of a loss equation as follows for calculation of engine power loss:

$$Ploss\_eng=\eta_{MAX}LHV(kJ/g)Q_{FUEL}(g/s)-P_{OUT}$$

where $\eta_{MAX}$ is the engine's maximum efficiency;

LHV(kJ/g) is the fuel's lower heating value;

$Q_{FUEL}$(g/s) is the fuel flow rate at operational conditions; and $P_{OUT}$ is the engine mechanical shaft output power at operational conditions.

Figure 8:
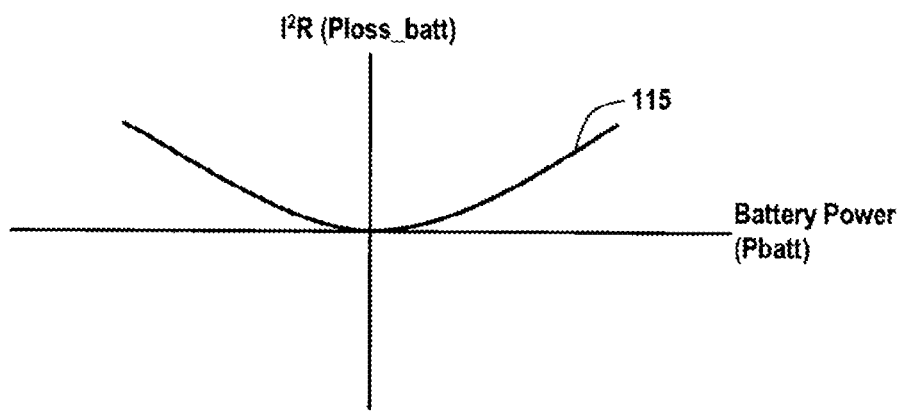
FIG. 8 is a graphical representation of battery power losses vs. battery power characteristic data utilized in the determination of battery power losses.

Conventional dynamometer testing is employed to establish the baseline $\eta_{MAX}$ and in the gathering and tabulation of the relative engine losses. Ploss_evt and Ploss_eng may also be combined into a single mechanical loss term or grouped together and referred to as Ploss_eng. The internal power losses for batteries Ploss_batt are commonly referred to as I2R losses. Ploss_batt data are provided for reference by the routine in pre-stored table format generated from battery equivalence models and indexed by battery power Pbatt. An exemplary representation of such characteristic battery power vs. loss data 115 is illustrated in FIG. 8. Exemplary subsystem power losses are illustrated across an exemplary input torque region in FIG. 5.

Continuing at step 136 and with further reference to FIGS. 11-14, additional subjective costs are preferably calculated to be factored into the selection of an optimum input torque operating point in accordance with the present invention. Subjective costs are penalties and, unlike the subsystem power losses described above, cannot be derived from physical loss models, but rather represent another form of penalty against operating the system at particular points. For example, in an energy storage system (ESS), such as BPM 21, factors such as extreme states of charge (SOC), voltage, and current can damage the batteries. In addition, the life of the batteries is related to the amp-hour throughput of the batteries. Thus, it is important for the vehicle control system to manage the batteries in such a way that these parameters are maintained within specified ranges to avoid damage to the system. Thus, a battery cost or penalty may be used to direct the selection of the operating point of the vehicle system (within the prescribed limits) based on the battery usage of the particular operating point and the associated impact or cost of the usage on the batteries. The battery cost may be based on any cost factor or parameter related to the batteries such as the state of charge (SOC). Hence, the battery costs may include a SOC cost factor. It is also important to manage the noise, vibration, and harshness (NVH) of a vehicle to avoid damage to the vehicle. Therefore, a NVH cost or penalty may also be used to select the operation point of the vehicle system. Such cost factors are preferably obtained from data sets stored in table form within data structures in system controller 43. It is also desirable to operate the vehicle at a certain temperature range. Accordingly, a temperature related cost may also be considered.

The turbocharger 47 typically increases the engine torque while improving its fuel economy. However, the vehicles may experience a turbo lag. A turbo lag is the period of time it takes the turbocharger 47 to provide a boost to the engine 14 to begin applying the desired torque. In other words, the turbocharger 47 provides a boost to the engine 14 only after the engine 14 is operating at or above a predetermined engine speed threshold. During a turbo lag, the operation of the vehicle feels sluggish. It is therefore desirable to reduce the turbo lag in order to reduce the sluggish feeling of the vehicle. Given that the engine torque Te rate of change can increase as the engine speed Ne increases, the engine speed Ne can be controlled to achieve a desired output torque To_des (FIG. 12) within a predetermined amount of time. In the powertrain system 11, the engine speed Ne may be selected and controlled taking into account the turbo lag. It is therefore possible to control the engine speed to reduce the turbo lag.

Figure 11:
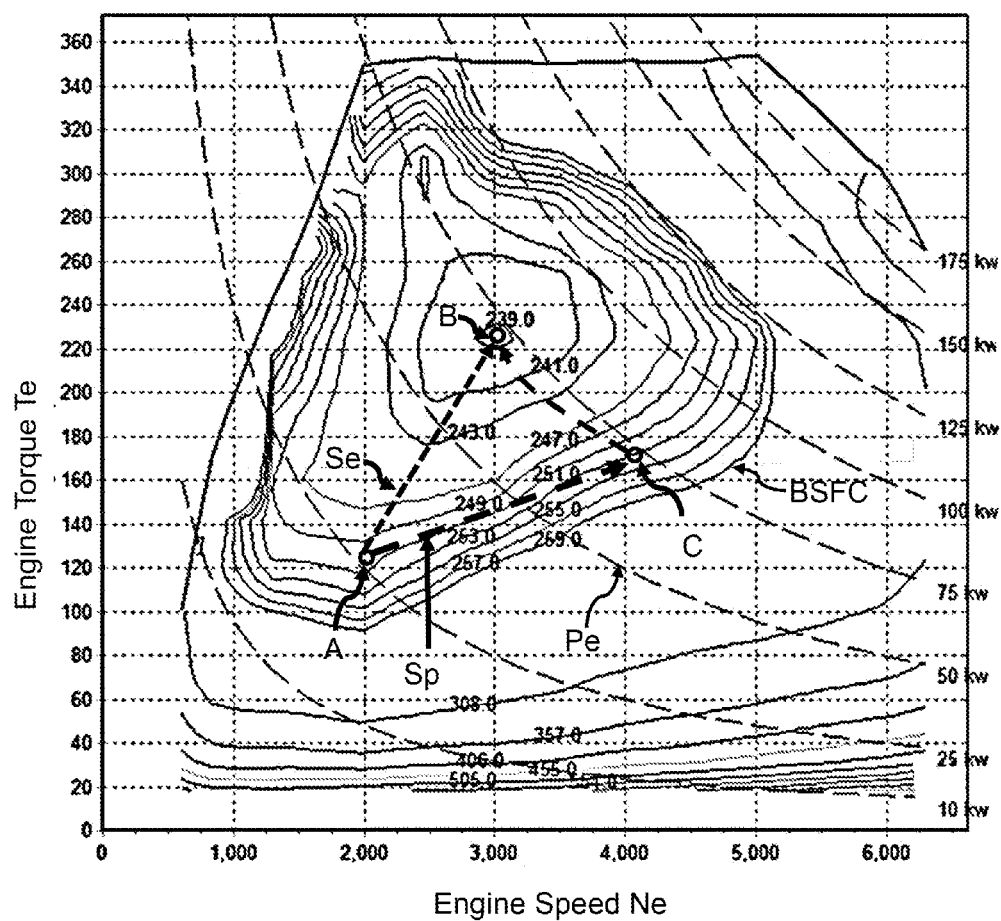
FIG. 11 is a graphical depiction of empirically determined engine torque vs. engine speed characteristics data utilized in determining the engine speed profile.

With reference to FIG. 11, the engine 14 operates at an initial operating point A. The initial operating point A includes an initial engine speed and an initial engine torque. The vehicle operator may then request a desired engine power Pe (e.g., 74 Kilowatts) by, for example, pressing the accelerator pedal. Upon receipt of the torque request from the vehicle operator, the system controller 43 controls the engine 14 such that the engine 14 operates at a conventional target operating point B that corresponds to the desired engine power Pe (e.g., 75 Kilowatts). In doing so, if the turbo lag is not considered, the system controller 43 selects the conventional target operating point B that corresponds to the minimum system losses. As seen in FIG. 11, when operating at the conventional target operating point B, the engine 14 exhibits the minimum brake specific fuel consumption BSFC. Accordingly, the engine 14 is controlled so that the engine speed Ne follows a conventional speed trajectory or profile Se from initial operating point A to conventional target operating point B. To reach the conventional target operating point B, the engine 14 may require a turbo boost from the turbocharger 47. However, if the engine 14 is operating at a relatively low engine speed Ne (e.g., less than 3000 RPM), the engine 14 may experience a turbo lag, causing the operation of the vehicle to feel sluggish.

With continuing reference to FIG. 11, if the turbo lag is considered, the engine 14 may reach the desired engine power Pe (e.g., 75 Kilowatts) faster than if the turbo lag is not considered. In considering the turbo lag, the system controller 43 may select a desired operating point C that is different than the conventional target operating point B. The engine speed Ne is higher at the desired operating point C than at the target conventional target operating point B. By selecting the operating point with the higher engine speed Ne (i.e., desired operating point C), the turbocharger 47 may provide a turbo boost to the engine 14 faster than if the system controller 43 selects the conventional target operating point B. Consequently, the engine 14 can produce the desired engine power Pe (e.g., 75 Kilowatts) faster if the desired operating point C is selected than if the conventional target operating point B is selected. Thus, upon receipt of a torque request, the system controller 43 may select the engine speed Ne that corresponds to the desired operating point C. Accordingly, the engine 14 is controlled so that the engine speed Ne follows a desired engine speed trajectory or profile Sp from initial operating point A to desired operating point C. Once the engine 14 supplies the desired engine power Pe (e.g., 75 Kilowatts), the system controller 43 may control the engine 14 so that the engine 14 operates at the conventional target operating point B, which corresponds to the minimum system power losses. It should be noted that the selection of point C is up to calibration based on turbo engine characteristics and the desired output torque request at the moment.

As discussed above, it is desirable to reduce the turbo lag in order to reduce the sluggish feeling of the vehicle. To do so, a cost or penalty associated with the turbo lag (i.e, a turbo cost Pcost_turbo) may be used to direct the selection of the operating point of the vehicle system (within the prescribed limits) based on a desired output torque rate of change necessary to reach a desired output torque To_des within a predetermined amount of time. The predetermined amount of time may be, for example, less than two seconds. The desired output torque To_des represents the system constrained output torque target for the control. It may correspond to the torque requested by the vehicle operator in the event that the request is within the system's capabilities. But it may correspond to a constrained output torque in accordance with system limits. The desired output torque To_des may also be constrained in accordance with other factors apart from system capabilities such as vehicle driveability and stability considerations. The turbo cost Pcost_turbo may also be referred to as turbo efficiency.

As used herein, the term "turbo efficiency" refers to the amount of time that it takes the turbocharger 47 to provide a turbo boos to the engine 14.

The total subjective costs is determined in accordance with the summation of the individual subjective costs as follows:

$$Pcost\_sub=Pcost\_SOC+Pcost\_NVH+Pcost\_Turbo$$

where Pcost_SOC is a SOC cost;
Pcost_NVH is an NVH cost; and
Pcost_Turbo is a Turbo lag cost.

Although only a few subjective costs are used in the equation above, other individual subjective costs may also be added such as motor temperature subjective costs, and clutch protection subjective costs, among others.

Utilizing this method for determining the overall system cost function to include specific turbo lag cost allows the optimal selection strategy to deviate from the system loss based optimal operating point to an operating point that reduces the turbo lag in accordance with a predetermined criteria. The operating point selected may be sub-optimal when only considering the system loss, but will be such that the system loss is as small as possible and the turbo lag is reduced.

Without inclusion of the turbo lag cost into the system cost function, the optimal strategy would select a point that would minimize system loss without regard for the turbo lag. Eventually, selecting operating points in this manner would result in the vehicle experiencing the effects of the turbo lag. At which time, the search space of the optimal strategy would be constrained by the hard limits imposed. By adding the turbo lag cost to the overall system cost function, the results of the optimization routine can be directed to select operating points not only based on the system loss, but also on the impact to the turbocharger 47. This allows the selection routine the flexibility to select operating points better suited for a higher engine speed, thereby reducing the turbo lag.

Of course, Pcost_sub is scaled into the same units as the subsystem power losses described above. Pcost_sub is therefore similarly seen plotted in FIG. 5 across the exemplary input torque region.

The total loss Total_loss is then determined as the summation of the subsystem power losses of Ploss_total and the scaled subjective cost penalties of Pcost_sub as follows:

$$Total\_loss=Ploss\_total+Pcost\_sub$$

Figure 5:
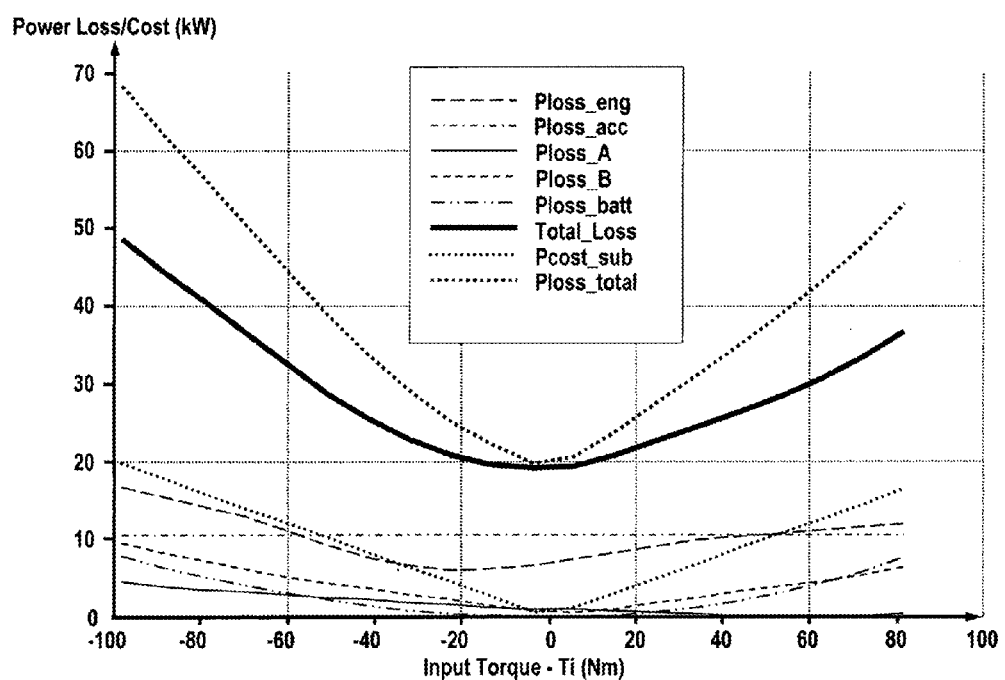
FIG. 5 is a plot of exemplary individual sub-system costs and aggregate system costs correlated to power across an input torque range useful in determining an optimum input torque operating point at a set of current system speeds and accelerations.

Total_loss is therefore similarly seen plotted in FIG. 5 across the exemplary input torque region. The overall system power losses Ploss_total may also be referred to as the aggregate system power losses. FIG. 5 is used for illustration purpose only. For the actual engine operation point selection, both the input speed and input torque are considered at the same time; however, the cost structure used for optimization is the same as shown in FIG. 5.

Figure 12:
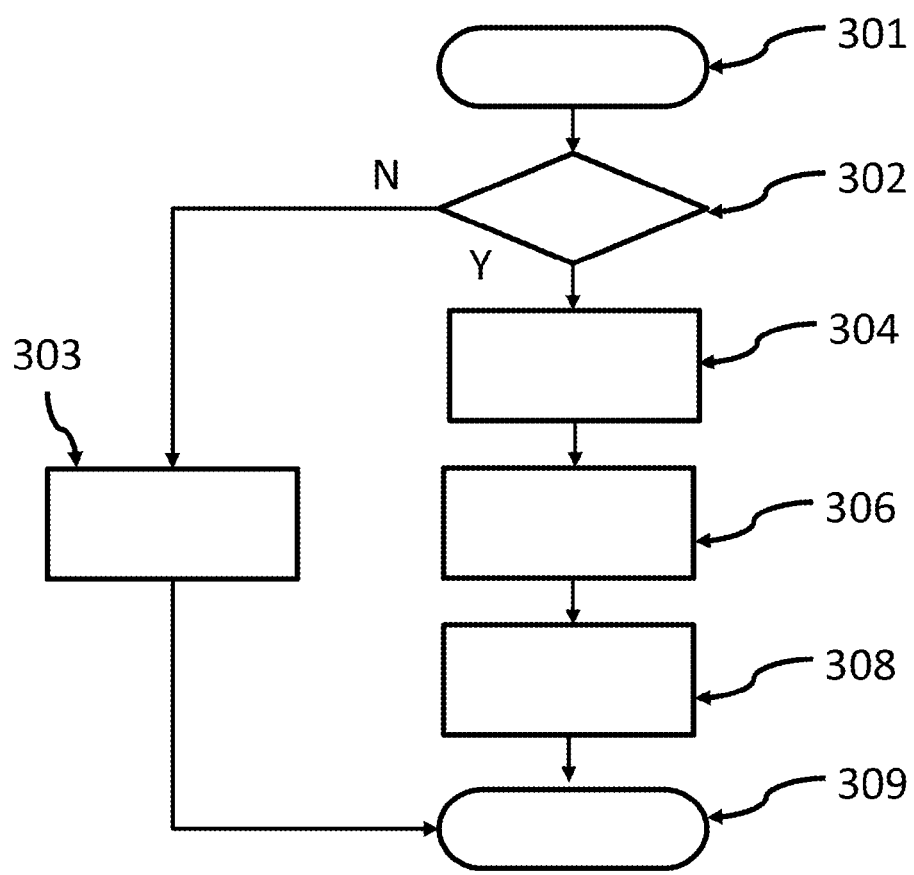
FIG. 12 illustrates a flowchart of exemplary steps in a set of instructions executed by computer based controller particularly suited to determine a cost factor associated with a turbo lag (i.e., turbo costs)

With reference to FIG. 12, the turbo lag cost, Pcost_turbo, may be determined as a function of an input torque rate of change Ti_dot_des necessary to reach a desired output torque To_des within a predetermined amount of time. The desired output torque To_des is in turn based on the torque request. The torque request is resolved from a plurality of operator inputs including: accelerator pedal position, brake pedal position and shift selector position, vehicle dynamic conditions such as acceleration rate or deceleration rate, and EVT operational conditions such as temperatures, voltages, currents and speeds. The process of determining the turbo cost begins at step 301. In step 302, it is first determined whether a turbo lag is expected. If a turbo lag is not expected, the system controller 43 assigns the turbo lag cost, Pcost_Turbo, a value of zero and, therefore, the turbo lag, Pcost_Turbo is not factored into the subjective costs. On the other hand, if a turbo lag is expected, the system controller 43 determines the desired input torque rate of change Ti_dot_des necessary to reach the desired output torque To_des within a predetermined amount of time based on the torque request. Specifically, the determination of whether a turbo lag is expected may be based on a plurality of operator inputs including current engine speed, current engine torque, acceleration rate, current output torque rate of change, and current output torque. Turbo lag typically occurs when the operator requests a significant amount of torque (a wide open throttle event or at least a partially open throttle event, also known as a fast tip-in event) and the engine speed is relatively low. In an embodiment, if the current engine speed Ne is less than a predetermined calibratable engine speed threshold, then the system controller 43 determines the desired input torque rate of change Ti_dot_des necessary to reach the desired output torque To_des within a predetermined amount of time based on the torque request. On the other hand, if the current engine speed is greater than the predetermined calibratable engine speed threshold, the system controller 43 assigns the turbo lag cost Pcost_Turbo a value of zero in step 303. Thus, when the engine is already operating at relatively high speeds or when the operator has not requested additional output torque, the system controller 43 assigns the turbo lag cost, Pcost_Turbo, a value of zero in step 303.

In step 304, the system controller 43 determines the desired input torque rate of change Ti_dot_des based on the output torque rate of change To_dot necessary to reach the desired output torque To_des within a predetermined amount of time. As discussed above, the desired output torque To_des is based on the torque request. The desired input torque rate of change Ti_dot_des can be in a pre-stored table format indexed by the target output torque To and the output torque rate of change To_dot. The tabulated data is referenced by the desired output torque To_des and the output torque rate of change To_dot.

Figure 13:
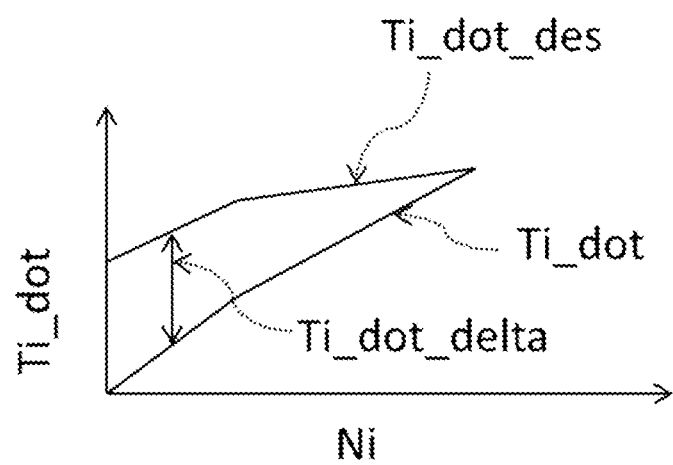
FIG. 13 is a graphical representation of empirically determined desired input torque rate of change and feasible input torque rate of change vs. input speed data utilized in determining an input torque rate of change disparity.

In step 306, once the desired input torque rate of change Ti_dot_des is determined, the system controller 43 calculates the difference between the desired input torque rate of change Ti_dot_des and the feasible input/engine torque rate of change Ti_dot for all feasible input speeds Ni based on the turbo engine characteristics. The difference between the desired input torque rate of change Ti_dot_des and the feasible input/engine torque rate of change Ti_dot is referred to as the input torque rate of change disparity Ti_dot_delta. An exemplary representation of such characteristic input speed Ni vs. desired input torque rate of change Ti_dot_des; the input speed Ni vs. feasible input torque rate of change Ti_dot; and the input torque rate of change disparity Ti_dot_delta is illustrated in FIG. 13.

Figure 14:
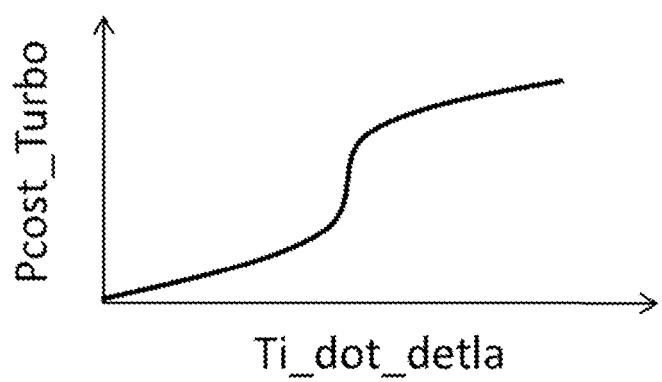
FIG. 14 is a graphical representation of empirically determined turbo costs vs. input torque rate of change disparity.

In step 308, the input torque rate of change disparity Ti_dot_delta is stored and serves as an input to determine the turbo lag cost Pcost_Turbo. The turbo lag cost is provided for reference by the routine in pre-stored table indexed by the input torque rate of change disparity, Ti_dot_delta, having been empirically derived from conventional dynamometer testing of the turbocharger 47 and the engine 14. An exemplary representation of such characteristic turbo lag cost Pcost_Turbo vs. input torque rate of change disparity Ti_dot_delta is illustrated in FIG. 14. The tabulated data is referenced by turbo lag cost Pcost_Turbo vs. input torque rate of change disparity Ti_dot_delta. The process of determining the turbo lag cost ends at step 309. Once determined, the turbo lag Pcost_Turbo may be factored in to determine the total subjective costs as discussed above with reference to step 136 illustrated in FIG. 9.

For illustration purpose, referring again to FIG. 9, in step 137, a comparison of the Total_loss determined at the evaluation input torque Ti_n and evaluation input speed Ni_n are compared with the Total_loss determined at the previous evaluation torque Ti_n−1 and previous input speed Ni_n−1. A first instance through the routine that would have no such prior Total_loss determination would simply result in the return of the routine to step 133 where a second evaluation input torque and input speed would be determined in accordance with the golden section ratio considerations. Of course, a 2-D golden section search can be used to determine both the engine speed and engine torque having the corresponding smallest Total_loss associated therewith.

Step 138 eliminates solution space in input torque and speed to the outside of the one of the evaluation input torques Ti_n and engine speed Ni_n and Ti_n−1 and engine speed Ni_n−1 associated with the larger of the respective Total_loss values corresponding thereto. The evaluation input torques Ti_n or Ti_n−1 and evaluation engine speed Ni_n or Ni_n−1 associated with the larger of the respective Total_loss values is then established as a new input torque/speed boundary for the range of remaining feasible input torques/speeds to be evaluated.

Step 139 next determines if a predetermined number of iterations through the section search has been performed. If not, then the routine returns to step 133 to select another evaluation torque/speed and loop through the routine steps 133-139. When the predetermined number of iterations has been accomplished, then step 140 is encountered whereat the optimum input torque Ti_opt and Ni_opt is set one of the current and immediate past evaluation input torques Ti_n or Ti_n−1 and evaluation input speeds Ni_n or Ni_n−1, having the corresponding smallest Total_loss associated therewith. The selected value for input torque and speed are now available for use in setting the engine torque and speed. Accordingly, the selected value for input torque (i.e., the optimum input torque Ti_opt) and input speed (i.e., optimum input engine speed Ni_opt) may be determined. As discussed above, the engine speed Ne and the EVT input speed Ni, and engine torque and EVT input torque, may be equivalent, respectively. Therefore, the selected value for the input torque (i.e., the optimum input torque Ti_opt), and the selected value for the input speed (i.e., the optimum input speed Ni_opt) may be used for setting an optimum engine torque (Te_opt) and engine speed (Ne_opt). This optimum input speed Ni_opt can be higher than an optimum input speed selected without considering the turbo cost Pcost_turbo. Consequently, by selecting this higher optimum input speed Ni_opt, the turbo lag is reduced because it does not take the turbocharger 47 as much time to boost the engine 14, as the engine 14 is chosen to run at a higher speed than it would normally operate if the turbo cost factor is not considered.

A section search performed in accordance with the described golden section ratio reduces the range of feasible input torques upon each subsequent evaluation by a factor of 1−Φ, or approximately 0.38197. Accuracy to within less than 1.0% can be established with eleven such evaluations. Modern engine controls are typically limited to control accuracy of substantially 1.0%. Evaluations beyond eleven are not presently believed to be of significant benefit. Hence, eleven such evaluations with the preferred golden section ratio search is the preferred number of evaluations performed. Accordingly, the feasible engine operating points may be defined feasible engine torque and feasible engine speeds. Since the feasible input torques may be equivalent to the feasible engine torques, the feasible engine operating space may include feasible EVT input torques and feasible EVT input speeds.

Figure 6:
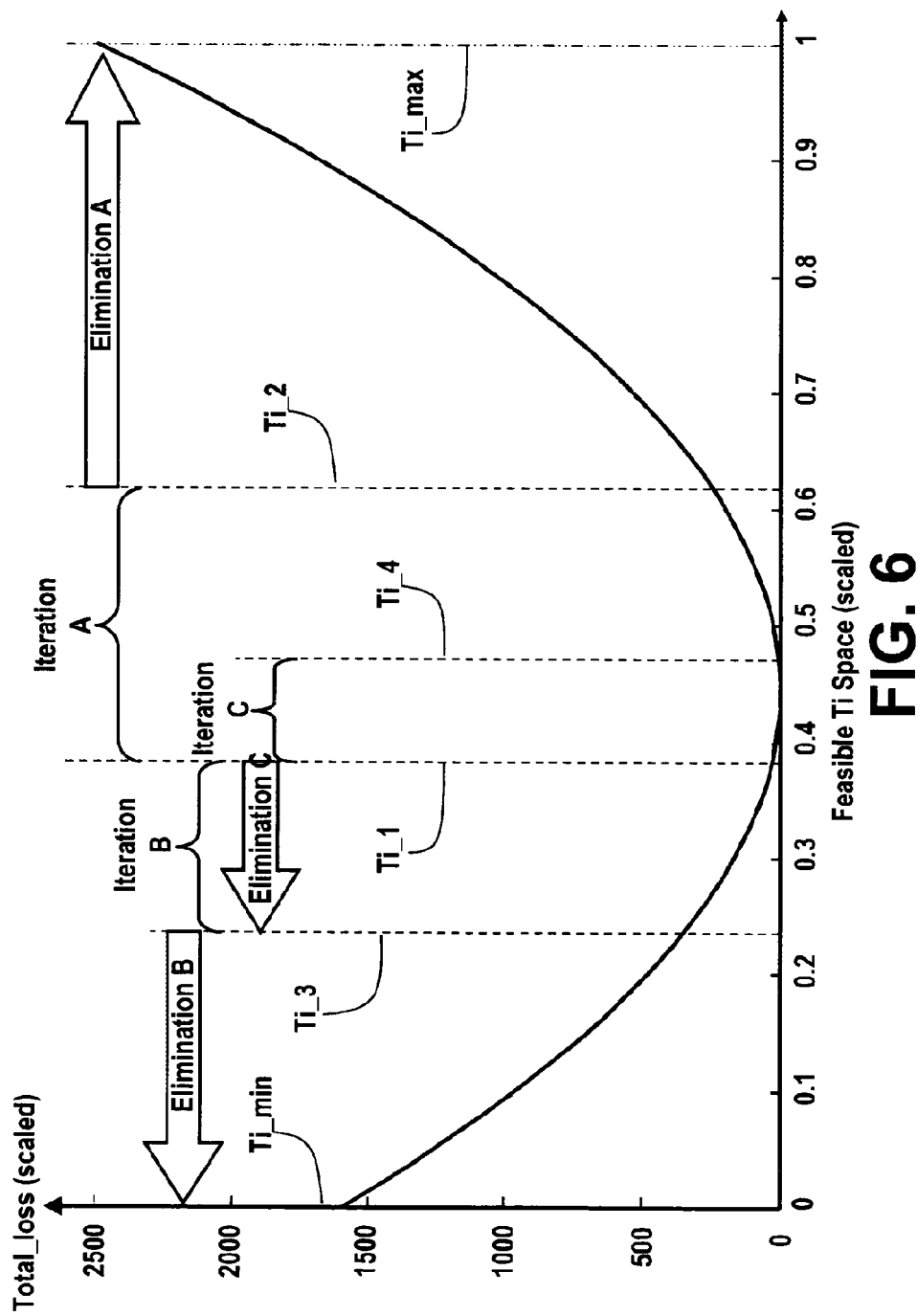
FIG. 6 is a graphical representation of a preferred technique for converging on a minimum system cost operating point in input torque.

Referring now to FIG. 6, an exemplary continuum of a range of input torques scaled between 0 and 1 appears across the horizontal axis. The initial range of the solution space in Ti corresponds to the Ti_min value (scaled to 0) and the Ti_max value (scaled to 1). Corresponding scaled and shifted Total_loss data are plotted against the vertical axis. A first comparison in accordance with the golden section ratio search would correspond to the pair of evaluation input torques associated with lines Ti_1 and Ti_2. Visual inspection confirms that Total_loss at Ti_2 is greater than Total_loss at Ti_1. Hence, the solution space to the outside of Ti_2 is eliminated from further consideration (elimination A) and the new solution space corresponds to the limits of Ti_min and Ti_2 (i.e. Ti_2 is the new Ti_max). In accordance with the golden section ratio criteria, another evaluation input torque is established at Ti_3 relative to the newest limit Ti_2. The lowest Total_loss from the previous iteration corresponding to Ti_1 is compared to the Total_loss from the current iteration corresponding to the newest evaluation input torque, Ti_3. Again from visual inspection it can be appreciated that Total_loss at Ti_3 is greater than Total_loss at Ti_2. Hence, the solution space to the outside of Ti_3 is eliminated from further consideration (elimination B) and the new solution space corresponds to the limits of Ti_3 and Ti_2 (i.e. Ti_3 is the new Ti_min). Once again, in accordance with the golden section ratio criteria, another evaluation input torque is established at Ti_4 relative to the newest limit Ti_3. The lowest Total_loss from the previous iteration corresponding to Ti_1 is compared to the Total_loss from the current iteration corresponding to the newest evaluation input torque, Ti_4. Again from visual inspection it can be appreciated that Total_loss at Ti_2 is greater than Total_loss at Ti_4. Hence, the solution space to the outside of Ti_2 is eliminated from further consideration (elimination C) and the new solution space corresponds to the limits of Ti_1 and Ti_2 (i.e. Ti_1 is the new Ti_min). This process is repeated consistently as described for a predefined number of iterations or comparisons at which point the optimum input torque is established as the one of the last two evaluation input torques corresponding to the smallest of the respective Total_loss values. FIG. 6 only shows a one variable golden section search. In the present disclosure, however, a 2-D golden section search is performed. Thus, another golden section search for the additional dimension (i.e., the input speed Ni) is performed as mentioned in FIG. 9.

Alternative section searches can be employed in similar fashion to converge to an optimum input speed and torque however with lesser efficiencies and uncertainties of reaching particular target accuracies within a known number of iterations or comparisons. Various other methods of solution convergence are also well known and applicable for implementation with the present invention including non-limiting examples of quadratic and other higher-order polynomial estimations and iterative derivative convergence techniques. Once the optimum engine speed, Ne_opt, is selected, the engine speed profile may be defined and the motor torques (Ta and Tb) can be calculated accordingly.

Figure 15:
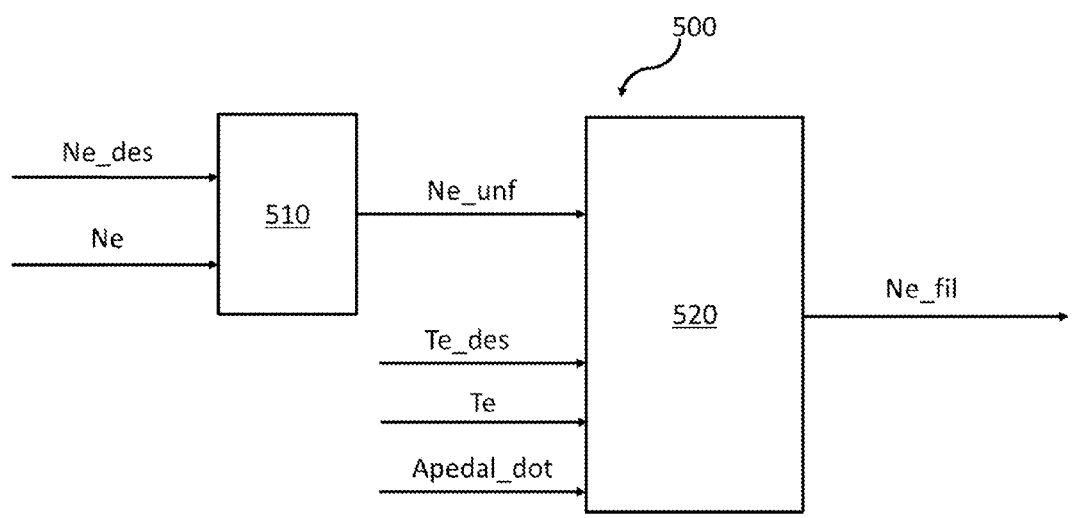
FIG. 15 illustrates an exemplary dataflow describing an exemplary method that can be utilized to determine an input speed profile.

FIG. 15 illustrates an exemplary dataflow 500 describing an exemplary method that can be utilized to determine the engine speed profile based on the optimum input torque Ti_opt, the optimum input speed Ni_opt, or both. Dataflow 500 begins with data inputs describing the desired engine speed Ne_des and the current engine speed Ne. The desired engine speed Ne_des may be equivalent to the optimum input speed Ni_opt. The current engine speed Ne may be obtained from an engine speed sensor configured to measure the engine rotational speed. These data inputs (i.e., the desired engine speed Ne_des and the current engine speed Ne) are processed by a signal processing module 510 to generate an output signal indicative of an unfiltered engine speed profile Ne_unf. Then, the output signal indicative of the unfiltered engine speed profile Ne_unf is then filtered by a filter 520, which may be a low pass filter, with a time constant. The time constant of the filter 520 may be a function of or dependent from an accelerator pedal position rate of change Apedal_dot and a difference between a desired engine torque Te_des and the current engine torque Te. The desired engine torque Te_des may be equivalent to the optimum input torque Ti_opt. The current engine torque Te may be obtained from a torque sensor configured to measure and monitor the engine torque Te. The filter 520 processes input signals describing the desired engine torque Te_des, the current engine torque Te, the unfiltered speed profile Ne_unf, and the accelerator pedal position rate of change Apdeal_dot to generate an output signal indicative of a filtered engine speed profile Ne_fil. Thus, the filter 520, among other things, calculates the difference between the desired engine torque Te_des and the current engine torque Te. The filtered speed profile Ne_fil may be constrained by certain system constraints such as battery power and motor torque. The system controller 43 may then control the engine 14 so that it follows the filtered speed profile Ne_fil. The engine 14 may be controlled via engine actuators such as spark plugs.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a powertrain system including an electro-mechanical transmission, an internal combustion engine, and a turbocharger, comprising:
    determining a torque request;
    selecting feasible input torque operating points;
    calculating aggregate system power losses corresponding to the selected feasible input torques and input speed capable of producing a desired output torque based on the torque request;
    determining turbo efficiency as a function of a difference between a feasible input torque rate of change and a desired input torque rate of change required to reach the desired output torque within a predetermined amount of time;
    summing the turbo efficiency to the aggregate system power losses to determine total system losses corresponding to feasible input torques capable of producing the desired output torque;
    determining a feasible input speed and input torque corresponding to a substantially minimum total system power loss; and
    selecting as a desired input speed and input torque that corresponds to the substantially minimum total system power loss.

2. The method of claim 1, wherein determining the turbo efficiency includes determining whether a turbo lag is expected.

3. The method of claim 2, wherein determining whether a turbo lag is expected includes comparing a current engine speed with a predetermined calibratable engine speed threshold.

4. The method of claim 3, wherein determining the turbo efficiency includes assigning the turbo efficiency a value of zero if the turbo lag is not expected.

5. The method of claim 3, wherein determining the turbo efficiency includes:
   determining the desired input torque rate of change to achieve the desired output torque if the turbo lag is expected; and
   calculating a difference between the desired input torque rate of change and the feasible input torque for all feasible input speeds.

6. The method of claim 1, wherein calculating aggregate system power losses includes calculating individual subsystem power losses, and summing the individual subsystem power losses.

7. The method of claim 6, wherein individual subsystem power losses include motor losses and transmission losses.

8. The method of claim 1, wherein determining the feasible input torque and input torque comprises performing an iterative derivative convergence.

9. The method of claim 3, wherein determining the feasible input speed comprises performing a section search in feasible input torques and corresponding total system losses.

10. The method of claim 1, further comprising determining an engine speed profile based on the desired input speed and a current engine speed.

11. The method of claim 10, wherein determining the input speed profile includes filtering the engine speed profile.

12. The method of claim 11, wherein filtering the engine speed profile includes using a filter with a time constant that is a function of an accelerator pedal position rate of change and a difference between a desired engine torque and a current engine torque.

13. A hybrid powertrain system comprising:
   an engine;
   a turbocharger disposed in fluid communication with the engine such that the turbocharger is configured to supply the engine with compressed air;
   an electrically variable transmission coupled to the engine and configured to transfer kinetic energy originating from the engine; and
   a system controller configured to:
      determine a torque request;
      select feasible input torque and input speed operating points;
      calculate aggregate system power losses corresponding to selected feasible input torques and input speed capable of producing a desired output torque based on the torque request;
      determine turbo efficiency as a function of a difference between a feasible input torque rate of change and a desired input torque rate of change required to reach the desired output torque within a predetermined amount of time;
      add the turbo efficiency to the aggregate system power losses to determine total system losses corresponding to feasible input torques and input speeds capable of producing the desired output torque;
      determine a feasible input speed and input torque corresponding to a substantially minimum total system power loss; and
      select as a desired input speed and input torque that corresponds to the substantially minimum total system power loss.

14. The hybrid powertrain system of claim 13, wherein the system controller is configured determine if a turbo lag is expected.

15. The hybrid powertrain system of claim 14, wherein the system controller is configured to determine if the turbo lag is expected by comparing a current engine speed with a predetermined calibratable engine speed threshold.

16. The hybrid powertrain system of claim 15, wherein the system controller is configured to determine the desired input torque rate of change to achieve the desired output torque if the turbo lag is expected.

17. The hybrid powertrain system of claim 16, wherein the system controller is configured to calculate a difference between the desired input torque rate of change and the feasible input torque for all feasible input speeds.

18. The hybrid powertrain system of claim 17, wherein the system controller is configured to determine an engine speed profile based on the desired input speed and a current engine speed.

19. The hybrid powertrain system of claim 18, wherein the system controller is configured to perform a section search in feasible input torques and input speeds and corresponding total system power loses to determine the optimal input torque and input speed.

* * * * *